(12) United States Patent
Breuer et al.

(10) Patent No.: US 11,486,440 B2
(45) Date of Patent: Nov. 1, 2022

(54) LENGTH-ADJUSTABLE STEERING SHAFT AND METHOD FOR PRODUCING A LENGTH-ADJUSTABLE STEERING SHAFT

(71) Applicants: THYSSENKRUPP PRESTA AG, Eschen (LI); thyssenkrupp AG, Essen (DE)

(72) Inventors: Marius Breuer, Fishers, IN (US); Janick Durot, Widnau (CH)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 863 days.

(21) Appl. No.: 16/326,858

(22) PCT Filed: Aug. 16, 2017

(86) PCT No.: PCT/EP2017/070765
§ 371 (c)(1),
(2) Date: Feb. 20, 2019

(87) PCT Pub. No.: WO2018/036880
PCT Pub. Date: Mar. 1, 2018

(65) Prior Publication Data
US 2019/0195271 A1 Jun. 27, 2019

(30) Foreign Application Priority Data
Aug. 24, 2016 (DE) .................... 10 2016 215 869.4

(51) Int. Cl.
*F16C 3/03* (2006.01)
*F16D 3/06* (2006.01)

(52) U.S. Cl.
CPC .............. *F16C 3/03* (2013.01); *F16D 3/06* (2013.01); *F16C 2326/24* (2013.01); *F16D 2250/0084* (2013.01); *Y10T 403/7033* (2015.01)

(58) Field of Classification Search
CPC ........ B62D 1/185; F16C 3/03; F16C 2326/24; F16D 3/06; F16D 2250/0084;
(Continued)

(56) References Cited

U.S. PATENT DOCUMENTS 5,640,884 A * 6/1997 Fujiu ..................... F16D 3/06
74/492
5,813,794 A * 9/1998 Castellon ............... F16D 3/06
464/162

(Continued)

FOREIGN PATENT DOCUMENTS

CN 1745013 A 3/2006
CN 202754015 U 2/2013
(Continued)

OTHER PUBLICATIONS

Specification Translation of JP 2004-217095. Telescopic Shaft for Vehicle Steering. Kanazawa, Yasuo. Jan. 15, 2003.*
(Continued)

*Primary Examiner* — Josh Skroupa
(74) *Attorney, Agent, or Firm* — thyssenkrupp North America, LLC (57) ABSTRACT

A length-adjustable steering shaft may include a metallic hollow shaft with an opening in which a metallic inner shaft is accommodated rotatably-fixedly and in an axially movable manner. The steering shaft may also include a pull-out retention means with an outer stop that protrudes into an opening of the hollow shaft and an inner stop that protrudes outward from the inner shaft. The inner and outer stops may
(Continued)

be formed from the metallic material of the hollow shaft or the inner shaft and may comprise stop surfaces that are directed toward each other in an axial direction. A layer of non-metallic material may be applied to at least one of the inner stop or the outer stop at least partially in a region of the stop surface.

11 Claims, 4 Drawing Sheets

(58) Field of Classification Search
CPC ..... Y10T 403/32475; Y10T 403/32524; Y10T 403/7033
USPC ................. 403/109.2, 109.8, 359.5; 464/162
See application file for complete search history.

(56) References Cited

U.S. PATENT DOCUMENTS

| | | | | |
|---|---|---|---|---|
| 6,093,107 | A * | 7/2000 | Merlo | F16C 3/03 464/162 |
| 6,099,036 | A * | 8/2000 | Fujiu | F16C 3/03 464/162 |
| 7,044,860 | B2 * | 5/2006 | Smith | F16C 3/03 464/162 |
| 9,157,482 | B2 | 10/2015 | Vasicek | |
| 10,451,118 | B2 * | 10/2019 | Krischak | F16D 3/06 |
| 10,641,315 | B2 * | 5/2020 | Brzezinski | F16D 3/06 |
| 2002/0157494 | A1 * | 10/2002 | Matsumoto | F16D 3/06 74/492 |
| 2005/0200111 | A1 * | 9/2005 | Cymbal | B62D 1/185 280/775 |
| 2006/0162989 | A1 | 7/2006 | Yamada | |
| 2007/0137378 | A1 * | 6/2007 | Bastein | F16D 3/06 74/493 |
| 2009/0270188 | A1 | 10/2009 | Yamada | |
| 2017/0036690 | A1 | 2/2017 | Bernhard | |

FOREIGN PATENT DOCUMENTS

| | | | | |
|---|---|---|---|---|
| CN | 205298306 | U | 6/2016 | |
| DE | 4008481 | A | 9/1991 | |
| DE | 102015216326 | A | 6/2016 | |
| DE | 102017208391 | A1 * | 11/2018 | ............. B62D 1/185 |
| GB | 2205149 | A | 11/1988 | |
| JP | 2004217095 | A | 8/2004 | |
| JP | 4176489 | B | 11/2008 | |
| JP | 2011117496 | A | 6/2011 | |
| WO | 2015/162019 | A | 10/2015 | |

OTHER PUBLICATIONS

English Translation of International Search Report issued in PCT/EP2017/070765, dated Oct. 18, 2017.

* cited by examiner

FIGURE 8  FIGURE 9

LENGTH-ADJUSTABLE STEERING SHAFT AND METHOD FOR PRODUCING A LENGTH-ADJUSTABLE STEERING SHAFT

CROSS REFERENCE TO RELATED APPLICATIONS

This application is a U.S. National Stage Entry of International Patent Application Serial Number PCT/EP2017/070765, filed Aug. 16, 2017, which claims priority to German Patent Application No. DE 10 2016 215 869.4, filed Aug. 24, 2016, the entire contents of both of which are incorporated herein by reference.

FIELD

The present disclosure generally relates to steering mechanisms, including length-adjustable steering shafts and methods for producing such length-adjustable steering shafts.

BACKGROUND

In order, in a motor vehicle, to permit an adjustment of the steering wheel relative to the driver's position in the longitudinal direction, i.e. in the direction of the longitudinal axis of the steering column, telescopic steering shafts are known, in which at least one shaft portion between the steering wheel and the steering mechanism can be adjusted in length. The length-adjustable steering shaft can form the driver-side steering spindle or the steering intermediate shaft between the steering spindle and the steering mechanism.

A length-adjustable steering shaft has a first shaft part which is in the form of a hollow shaft and in the axial opening of which a second shaft part, which is in the form of an inner shaft, is fixed in terms of torque and is displaceable in the axial direction, in other words is accommodated in a telescopic manner. The connection fixed in terms of torque takes place via form-fitting elements, for example an external toothing of the inner shaft which engages in a form-fitting manner in a corresponding internal toothing in the opening with respect to a rotation about the longitudinal axis, as described, for example, in U.S. Pat. No. 9,157,482 B2 or JP 2004217095. In order to ensure reliable transmission of the steering moment, both the hollow shaft and the inner shaft are manufactured from a metallic material, generally from steel or an aluminum alloy.

In order to prevent the inner shaft being separated from the hollow shaft by being completely pulled out therefrom during the adjustment of the steering column or during the installation, a pull-out retention means with stop elements is provided, the stop elements comprising at least one inner stop protruding from the inner shaft radially outward from the outer lateral surface, and an outer stop protruding radially inward into the cross section of the opening of the outer shaft. In the assembled state of the steering shaft, said outer and inner stops comprise stop surfaces which are directed axially toward each other and overlap in the radial cross section in such a manner that they are moved toward each other and strike against each other when the inner shaft is pulled out in the axial direction before the end of the inner shaft reaches the free opening of the hollow shaft. The axial relative movement of hollow shaft and inner shaft is therefore restricted in the end pull-out position.

It is known from JP 2004217095 to realize an outer stop by an inwardly projecting deformation, for example a calking of the hollow shaft in the edge region of the opening, against which the teeth which protrude radially from the inner shaft and form the inner stop can strike during the pulling out. In order to be able to reliably absorb the forces acting to maximum effect during the pulling out, both the outer stop and the inner stop are formed from the metallic material of the inner and outer shaft, generally from steel or an aluminum alloy, wherein the stop surfaces which come into contact during the striking against each other are likewise formed by metallic surfaces. In a similar manner, it is proposed in U.S. Pat. No. 9,157,482 B2 to plastically form impressions in the end side of the metallic hollow shaft in order to form at least one inner stop which protrudes at the edge of the opening radially inward into the opening cross section and, in the end pull-out position, block the axial movement of an inner stop in the form of a tooth arranged on the inner shaft. The stop surfaces striking against one another here likewise have metallic surfaces, generally of steel or an aluminum alloy.

The stop elements formed from the metallic material from the hollow shaft and the inner shaft ensure that the steering shaft is not detached even when high pull-out forces are exerted. However, when the end position is reached, the metallic stop surfaces impact against each other with a blow, as a result of which an undesirable production of noise may occur. In addition, the hard metallic stop is perceived haptically as unpleasant during the adjustment of the steering column.

Thus a need exists to develop a length-adjustable steering shaft to the effect that the noise behavior upon impact is improved and improved haptics are achieved.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to length-adjustable steering shafts. Some length-adjustable steering shafts may comprise a hollow shaft made of metallic material with an opening, in which an inner shaft made of metallic material is accommodated fixedly in terms of torque and in an axially movable manner. The length-adjustable steering shaft may further comprise a pull-out retention means with stop elements that comprise at least one outer stop that protrudes into the opening of the hollow shaft, and an inner stop that protrudes outward from the inner shaft. The outer stop may be formed from the metallic material of the hollow shaft, and the inner stop may be formed from the metallic material of the inner shaft. The stop elements may comprise stop surfaces that are directed toward each other in an axial direction.

In some examples, a layer of non-metallic material may be applied to at least one of the stop elements at least partially in a region of a stop surface.

According to the invention, at least one of two interacting stop elements, i.e. an inner or outer stop, or else both stops, comprises an at least partial coating or covering made of a non-metallic material. Said coating or covering forms an outer layer which extends in the region of the stop surface. On its side facing the stop element, the layer is connected to the metallic surface. The free surface on that side of the layer which faces away from the stop element serves as a non-metallic stop surface which can come into contact with the corresponding stop.

The layer according to the invention is located in the axial direction between the stop surfaces of the stop elements, and therefore, when the end position is reached, a metallic stop surface always strikes against a non-metallic surface, i.e. no metal-metal contact takes place. As a result, the production of noise is reduced.

It is possible for only one of two interacting stop elements to be provided with a non-metallic layer according to the invention, for example an inner stop or an outer stop. As a result, a metallic stop surface strikes against a non-metallic stop surface, as a result of which the damping according to the invention can already be realized. An advantage of this design is that only one of the shafts has to be provided with the layer, and the outlay on manufacturing is low. Alternatively, both interacting stop elements can also comprise a non-metallic layer. As a result, it is possible to in each case keep the layer thickness of the non-metallic layer smaller. In addition, it is conceivable to form the layers interacting at the stop from different non-metallic materials which have different properties, for example with regard to hardness, elasticity, abrasion resistance or tearing strength and the like. An appropriate choice of material permits optimization to the respective requirements. The individual layer thicknesses can also differ in specification.

It is advantageous that the non-metallic material is softer than the metallic material of the hollow shaft and inner shaft. As a result, the pulse introduced into the stop surfaces when they strike together is damped mechanically by the layer, and therefore the stop feels haptically less hard and fewer vibrations and noises occur or are transmitted.

The thickness of the layer, in particular in the normal direction of the stop surfaces, can be predetermined in order to adjust the damping action taking into consideration the properties of the non-metallic material and to optimize same with respect to the stresses to be anticipated during operation. For example, a certain damping can be realized by a greater layer thickness of a harder non-metallic material, or by a thinner layer of a softer non-metallic material.

The non-metallic material is preferably a thermoplastic. Thermoplastics, such as, for example, polypropylene (PP), polyaryl ether ketones (PAEK), polyoxymethylene (POM), polyphthalamides (PPA) or polyamide (PA) are distinguished by a large range of possible material properties and can therefore be selected for optimum adaption to the desired stop behavior. For example, use can be made of thermoplastic elastomers which can be adapted in respect of elasticity and damping behavior. Furthermore, economical processing and application to the stop elements is possible, for example by means of injection molding.

It can be provided that the material is fastened to the stop element substance-to-substance. The non-metallic material can be, for example, adhesively bonded or welded to the metallic surface, specifically continuously over the surface area or in partial regions of the contact surface between the layer and the stop elements. For the adhesive bonding, a suitable adhesive can be introduced between the layer and the respective stop element. Alternatively, a substance-to-substance connection can be produced by means of ultrasonic welding or friction welding. If a thermoplastic is used as the non-metallic material, said thermoplastic can be applied in the molten state to the stop element by injection molding or insert molding, as a result of which the layer adheres to the metallic surface substance-to-substance.

The metallic surface of the hollow shaft or inner shaft can be configured so as to increase the adhesion in the region of the stop element where the layer is intended to be applied. The adhesion-increasing configuration can be achieved by means of a surface texturing, for example by means of a defined roughness, or mechanical profiling, such as knurlings, flutings, impressions or the like.

It can furthermore be provided that the stop element is at least partially enclosed in a form-fitting manner by the layer. Additionally or alternatively, the layer can thereby be connected in a form- or force-fitting manner in the region of a stop element to a hollow shaft or inner shaft. For example, form-fitting elements which intermesh in the circumferential direction and/or longitudinal direction can be formed on the layer and the respective shaft. Force-fitting bracing is likewise conceivable and possible, for example by the layer elastically engaging around the respective shaft or the stop element formed thereon.

If the layer is in the form of an insert molding, in which the stop element is entirely or partially insert molded with thermoplastic in order to form the layer, said stop element can be completely or partially embedded in the layer or enclosed by the latter by a force- and form-fitting connection being produced which is particularly secure and reliable.

The stop element is preferably formed integrally with the metallic hollow shaft or inner shaft. As a result, the stop element has a metallic, mechanically loadable basic structure which is connected according to the invention to the non-metallic layer. The integral basic structure can be produced by plastic deformation of the metallic material in the end region of the hollow shaft and inner shaft. An outer stop can be formed by the edge of the free opening of the hollow shaft being deformed radially inward, for example by end-side moldings which displace the metallic material in order to form at least one outer stop protruding into the opening cross section. An inner stop can be manufactured in the end region of the end entering the hollow shaft, for example by a notch being calked into the outer surface of the inner shaft, preferably obliquely with respect to the longitudinal axis, at the edge of which notch the metallic material of the inner shaft is plastically displaced and accumulated radially outward in the form of a "pinch" in order to form an inner stop. On the side of the notch, the stop surface which is provided according to the invention with the non-metallic material is produced at the metallic pinch.

It can be provided that the hollow shaft and the inner shaft comprise form-fitting elements which intermesh in a form-fitting manner with respect to a rotation about the longitudinal axis and are at least partially covered with the layer. The form-fitting elements can be designed as intermeshing outer and inner toothings with grooves extending in an axially parallel manner in the longitudinal direction and teeth engaging in said grooves, as is basically known from the length-adjustable steering shafts known from the prior art. The non-metallic layer according to the invention can form a sliding layer which is arranged in the radial direction between the metallic toothings and ensures low-friction and low-play adjustability. The layer can be designed, for example, as an insert molding of thermoplastic which not only at least partially encloses the teeth on their radial outer side, but also at least one of the stop elements on the axial stop surface thereof. This design has the advantage that a previously known insert molding used, however, only as a sliding coating by extension thereof to a stop element carries out the additional function of the impact damping according to the invention. The functionality according to the invention can thereby be virtually realized without an additional outlay in terms of manufacturing technology.

The layer can extend in the longitudinal direction over a layer length, wherein the outer diameter of the layer remains the same with respect to the longitudinal axis. The metallic stop element can preferably be embedded into the layer, wherein the outer side of the layer runs parallel to the longitudinal axis over and beyond the stop element. The layer can be integrally formed on the inner shaft, for example by insert molding, and can extend over part of the length thereof parallel to the longitudinal axis. A stop element can be formed, as described, in the region of the free end of the inner shaft, for example as an inner stop in the form of a pinch, described above. The inner stop is located within the layer which can be formed as an insert molding which extends with a uniform cross section in the longitudinal direction and is composed of thermoplastic.

The prior art discloses a method for producing a length-adjustable steering shaft, comprising a hollow shaft made of metallic material with an opening, in which an inner shaft made of metallic material is accommodated fixedly in terms of torque and in an axially movable manner, and which comprises a pull-out retention means with stop elements which comprise at least one outer stop which protrudes into the opening of the hollow shaft, and an inner stop which protrudes outward from the inner shaft, wherein the outer stop is formed from the metallic material of the hollow shaft and the inner stop is formed from the metallic material of the inner shaft, wherein the stop elements comprise stop surfaces which are directed toward each other in the axial direction, with the following steps:

providing a respective metallic hollow shaft and inner shaft, producing an inner stop with an axial stop surface on the inner shaft, said inner stop protruding radially outward from the outer circumference of the inner shaft, introducing the inner shaft in the axial direction into the opening of the hollow shaft, producing an outer stop with an axial stop surface on the hollow shaft, said outer stop engaging radially inward in the open cross section of the opening, wherein the stop surfaces of inner and outer stop are directed toward each other in the axial direction.

In order to produce a steering shaft in which the noise behavior upon impact is improved and which has improved haptics, it is proposed according to the invention that before the inner shaft is introduced into the opening of the hollow shaft, a layer of non-metallic material is at least partially applied in the region of at least one of the stop surfaces.

By means of the method step according to the invention, a non-metallic layer, the possible refinements of which are described further above, is applied to the inner stop protruding radially from the inner shaft.

The non-metallic layer can be a plastics coating, preferably of thermoplastic, which is applied as an insert molding to the inner shaft by injection molding. According to the invention, the layer covers an axial stop surface of the inner stop, or at least a part thereof. An advantageous refinement makes provision for the hollow shaft and the inner shaft to comprise form-fitting elements which intermesh in a form-fitting manner with respect to a rotation about the longitudinal axis and are at least partially covered on their surfaces with the layer. The form-fitting elements can be designed as external and internal toothings which intermesh and have grooves extending in an axially parallel manner in the longitudinal direction and teeth engaging in said grooves, wherein the layer is at least partially located in partial regions between the external toothing and internal toothing. Said layer as a sliding layer provides an improved sliding behavior there during the axial adjustment of the steering shaft.

As described above, an inner stop can be plastically introduced, preferably calked, into the inner shaft in the form of a pinch (plastically deformed material accumulation). An inner stop can preferably be arranged in a circumferential region between adjacent teeth, for example at a base within a groove. The layer thickness can be dimensioned in such a manner that the inner stop is completely embedded into the cross section of the layer, wherein the layer has an outer surface which is continuously smooth specifically in an axially parallel manner in the longitudinal direction. Alternatively, the inner stop can be embedded in a rib formed by the layer.

The insert molding of the form-fitting elements and of the inner stop can take place in a single injection molding process. As a result, an improved, damped stop element according to the invention can be provided without an additional outlay on manufacturing.

Figure 1:
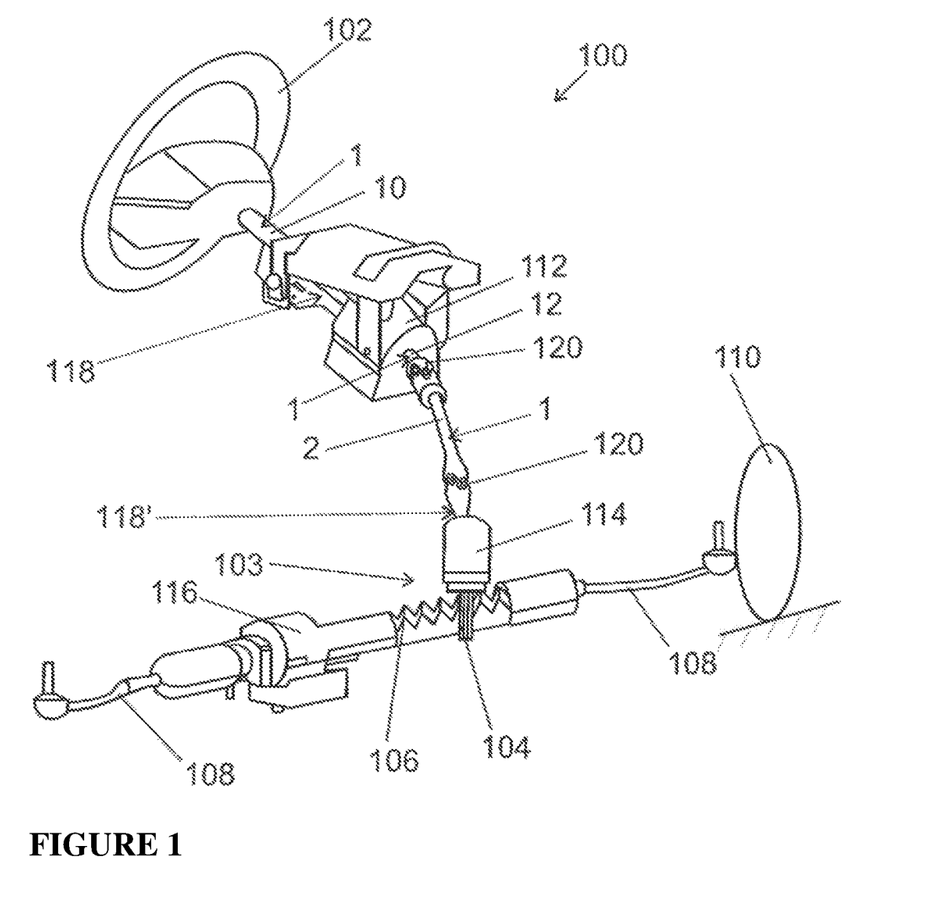
FIG. 1 is a schematic perspective view of an example motor vehicle steering system.

FIG. 1 schematically illustrates a motor vehicle steering system 100, wherein a driver can introduce a corresponding steering torque (steering moment) as a steering command into a steering shaft 1 via a steering wheel 102. The steering moment is transmitted via the steering shaft 1 to a steering pinion 104 which meshes with a rack 106 which then, for its part, transmits the predetermined steering angle to the steerable wheels 110 of the motor vehicle via a displacement of the tie rods 108.

An electrical power assistance can be provided in the form of a power assistance 112 coupled on the input side to the steering shaft 1, a power assistance 114 coupled to the pinion 104 and/or a power assistance 116 coupled to the rack 106. The respective power assistance 112, 114 or 116 couples an auxiliary torque into the steering shaft 1 and/or the steering pinion 104 and/or an auxiliary force into the rack 106, as a result of which the driver is assisted during the steering operation. The three different power assistances 112, 114 and 116 illustrated in FIG. 1 show possible positions for the arrangement thereof.

Customarily, only a single position of the positions shown is occupied by a power assistance 112, 114 or 116. The auxiliary torque or the auxiliary force which is intended to be applied by means of the respective power assistance 112, 114 or 116 in order to assist the driver is determined taking into consideration a steering moment which is determined by a torque sensor 118 and is introduced by the driver. Alternatively or in combination with the introduction of the auxiliary torque, an additional steering angle can be introduced by the power assistance 112, 114, 116 into the steering system and is accumulated with the steering angle applied by the driver via the steering wheel 102.

The steering shaft 1 comprises, on the input side, an input shaft 10 which is connected to the steering wheel 102 and, on the output side, an output shaft 12 which is connected to the rack 106 via the steering pinion 104. The input shaft 10 and the output shaft 12 are coupled to each other in a torsionally flexible manner via a torsion bar, which cannot be seen in FIG. 1. A torque admitted to the input shaft 10 by a driver via the steering wheel 102 therefore always leads to a relative rotation of the input shaft 10 with respect to the output shaft 12 when the output shaft 12 does not rotate exactly synchronously with respect to the input shaft 10. Said relative rotation between input shaft 10 and output shaft 12 can be measured via a rotational angle sensor and correspondingly because of the known torsional rigidity of the torsion bar a corresponding input torque relative to the output shaft 12 can be determined. The torque sensor 118 can thereby be formed by the determination of the relative rotation between input shaft 10 and output shaft 12. Such a torque sensor 118 is known in principle and can be realized, for example, by an electromagnetic sensor arrangement, as will be described further below, or by a different measurement of the relative rotation.

Accordingly, a steering moment which is applied by the driver via the steering wheel 102 to the steering shaft 1 or the input shaft 10 will only bring about the admission of an auxiliary torque by one of the power assistances 112, 114, 116 when the output shaft 12 is rotated relative to the input shaft 10 counter to the rotational resistance of the torsion bar.

The torque sensor 118 can also alternatively be arranged at the position 118', wherein the breakthrough of the steering shaft 1 into the input shaft 10 and output shaft 12 and the torsionally flexible coupling via the torsion bar are correspondingly present at a different position in order from the relative rotation of the output shaft 12, which is coupled to the input shaft 10 via the torsion bar, to be able to determine a relative rotation, and therefore correspondingly, an input torque and/or an auxiliary torque to be introduced.

The steering shaft 1 according to FIG. 1 furthermore comprises at least one cardanic joint 120 by means of which the profile of the steering shaft 1 in the motor vehicle can be adapted to the spatial conditions. The steering intermediate shaft of the steering shaft 1, which, in the example illustrated, is arranged between two cardanic joints 120 and connects the output shaft 12 to the pinion 104 of the steering mechanism 103, is designed according to the invention as a length-adjustable steering shaft 2.

Figures 2, 3:
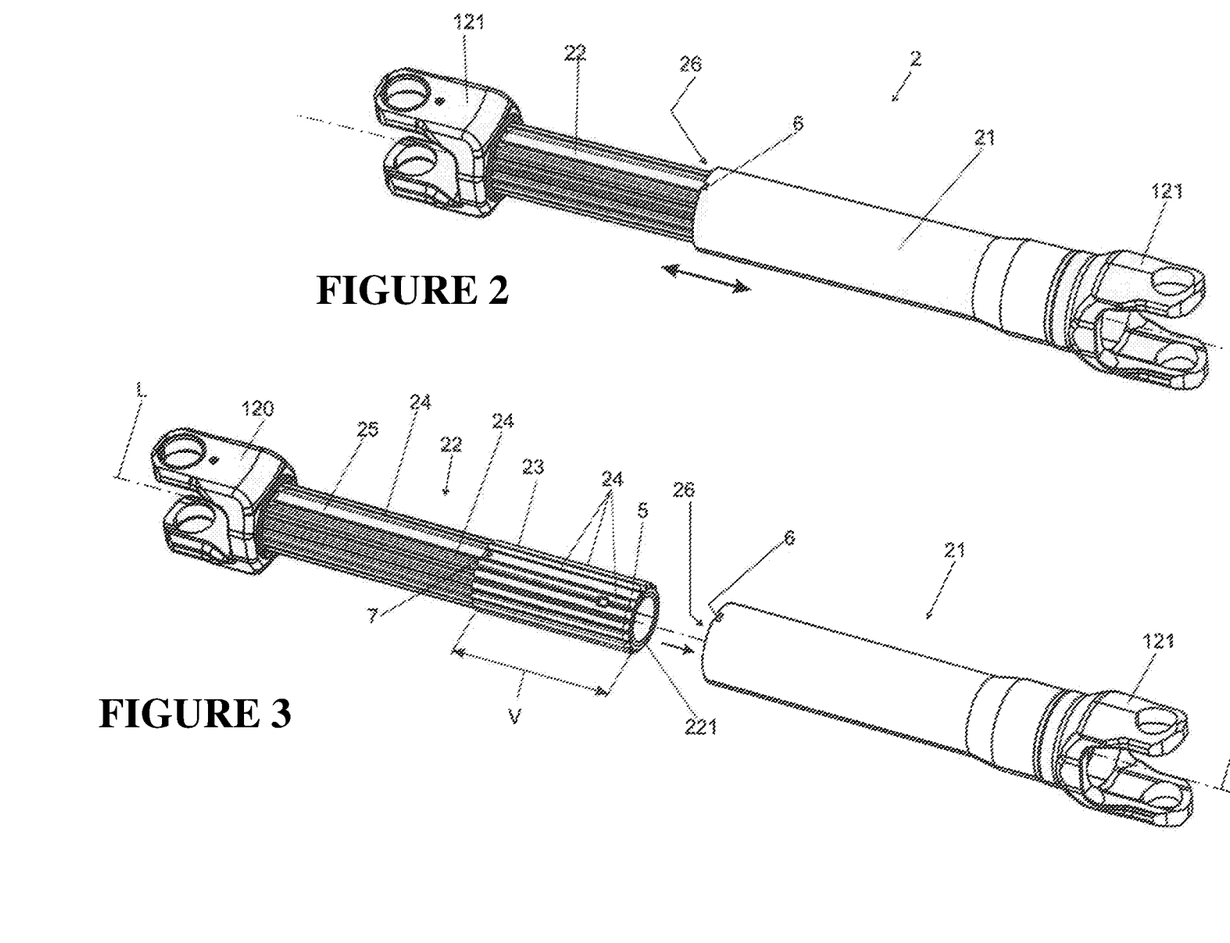
FIG. 2 is a perspective view of an example length-adjustable steering shaft.
FIG. 3 is a partially-exploded perspective view of the example steering shaft according to FIG. 2.

FIG. 2 and FIG. 3 show the steering shaft 2 in the mounted state (FIG. 2) and in a pulled-apart state in the axial direction (FIG. 3).

The length-adjustable steering shaft 2 comprises a hollow shaft 21 and an inner shaft in the form of a splined shaft 22. The splined shaft 22 has a toothing 23 in the form of an external toothing with a plurality of teeth 24 which are arranged on the outer circumference and extend axially in the direction of the longitudinal axis L. The toothing 23 is insert molded over a length V of the toothing 23 of the splined shaft 22 with a layer 5 in the form of a sliding layer, and therefore the teeth 24 are covered by the layer 5. A joint fork 121 of a joint 120 is attached at the end facing away from the insert-molded toothing 23. Alternatively, it can be provided that the toothing 23 is only formed in that region of the splined shaft in which the layer 5 is subsequently intended to be applied, i.e. the toothing is not formed over the entire length of the splined shaft 22, and therefore a toothing is formed only in an axial region of the splined shaft.

Figures 4, 5, 5A, 6:
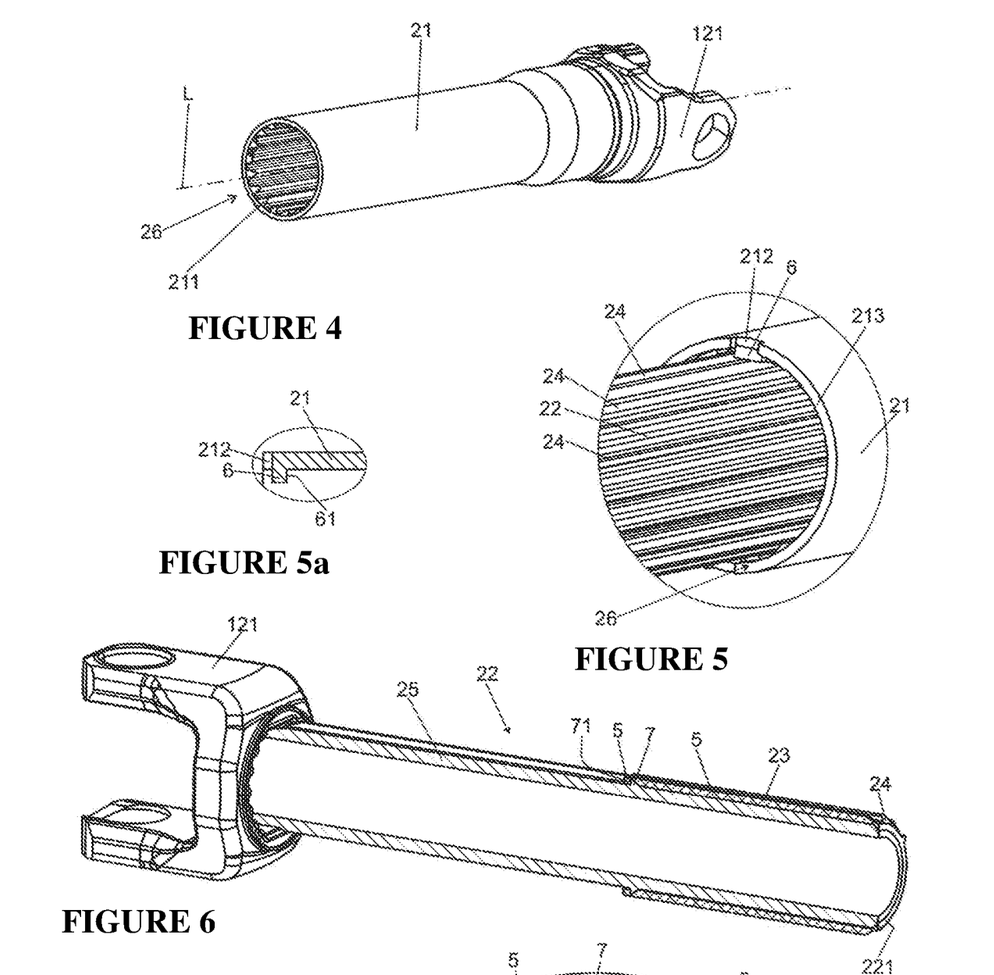
FIG. 4 is a perspective view of an example hollow shaft of the steering shaft according to FIG. 2.
FIG. 5 is a detailed view of the example steering shaft according to FIG. 2.
FIG. 5*a* is a partial sectional view of the example hollow shaft according to FIG. 5.
FIG. 6 is a longitudinal sectional view along a longitudinal axis through the hollow shaft according to FIG. 4.

It can be gathered from FIG. 4 that the hollow shaft 21 comprises an opening 26 which is open toward the splined shaft 22 and has an internal toothing 211 in which the toothing 23 can be accommodated in a form-fitting manner. In order to produce a connection fixed in terms of torque, the splined shaft 22 is introduced from the situation illustrated in FIG. 3 in the axial direction, as indicated therein by the arrow, in the direction of the longitudinal axis L into the opening 26 of the hollow shaft 21 such that the mounted state illustrated in FIG. 2 is reached. In said assembled state, the splined shaft 22 and the hollow shaft 21 can move relative to each other along the longitudinal axis L in order to compensate for spacing differences, as indicated by the double arrow.

A joint fork 121 of a joint 120 is attached to the hollow shaft 21 at the end facing away from the opening 26.

It can be gathered from FIG. 3 that the splined shaft 22 comprises a stem 25 outside the toothing 23, wherein, in the example illustrated, the length V of the toothing 23 is insert-molded with the layer 5 in the form of a sliding layer.

FIG. 5 shows in an enlarged illustration how the splined shaft 22 is introduced axially into the opening 26 of the hollow shaft 21. A molding 212 is calked plastically into the axial end surface 213 of the hollow shaft 21 in order to form an outer stop 6. The outer stop 6 protrudes inward into the opening cross section of the opening 26. In the longitudinal section, which is shown in FIG. 5a, through the outer stop 6 along the longitudinal axis L, it can be seen that an axial stop surface 61 is formed on the region protruding inward into the opening 26. The fact that the stop surface 61 is oriented axially means that the normal direction thereof at least partially points in the axial direction parallel to the longitudinal axis L, specifically into the opening 26, as seen from the end of the hollow shaft 22. In other words, the stop surface 61 is formed in such a manner that it can interact with a stop surface 71 of the splined shaft 22 such that an axial displacement of the splined shaft 22 is restricted in one direction with respect to the hollow shaft 21.

The outer stop 6 is located in a region between two teeth 24, which are adjacent in the circumferential direction, of the splined shaft 22.

FIG. 6 shows the splined shaft 22 in an enlarged illustration in which the stem 25 and the toothing 23 are illustrated sectioned along the longitudinal axis L. The sectional plane lies here in the circumferential direction between adjacent teeth 24.

Figure 7:
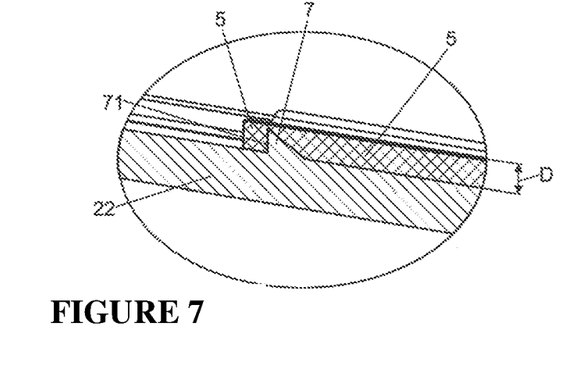
FIG. 7 is a detailed view of the longitudinal section according to FIG. 6.

FIG. 7 shows an enlarged detail in the rear end region of the layer 5, which end region faces away from the free end 221 of the splined shaft 22. It can be seen therefrom how an inner stop 7 which protrudes radially outward from the outer surface, i.e. the outer lateral surface of the splined shaft 22, is formed. The inner stop 7 has an axial stop surface 71, the normal direction of which points at least partially in the axial direction parallel to the longitudinal axis L, specifically away from the free end 221. In the assembled state of FIG. 2, the stop 7 is located within the hollow shaft 21, wherein at least one component of the normal direction of the stop surface 71 is directed out of the opening 26.

The outer stop 6 and the inner stop 7 are arranged in such a manner that, in the assembled state according to FIG. 2, the stop surfaces 61 and 71 coincide or overlap in cross section and therefore lie opposite each other in the axial direction. In other words, the outer stop 6 forms an undercut which is effective in the direction of the longitudinal axis such that, when the splined shaft 22 is pulled out of the opening 26 of the hollow shaft 21, the inner stop 7 strikes with its stop surface 71 against the stop surface 61 of the outer stop 6.

The inner stop 7 and the outer stop 6 are formed integrally with the splined shaft 22 and the hollow shaft 21, respectively, and consequently consist of the respective metallic material, generally steel or an aluminum alloy.

According to the invention, the layer 5 of non-metallic material is applied to the inner stop 7 in the region of the stop surface 71. The layer 5 is preferably composed of a thermoplastic or elastomer and can be applied substance-to-substance. The stop surface 61 strikes against the material of the layer 5 which is applied to the stop surface 71. When the stop surface 61 strikes against the layer 5, force is conducted through the layer 5 onto the stop surface 71.

In the example shown, the layer 5 extends over substantially the entire toothing 23. In the assembled state, the layer 5 acts as a friction-reducing sliding layer between the metallic surfaces of the hollow shaft 21 and the splined shaft 22. As emerges from FIGS. 6 and 7, the layer 5 has a uniform layer thickness D in the axial direction, specifically also in the circumferential region in which the outer stop 6 is located. However, the layer thickness D has different values in the circumferential direction, i.e. the layer thickness D is thinner in the region of the tooth tips of the teeth 24 than in the tooth root region of the teeth 24. The inner stop 7 is completely embedded here into the layer 5, as can be seen in FIG. 7. The layer thickness D is greater than the radial height of the inner stop 7, by which the latter protrudes radially from the outer surface of the splined shaft 22. As a result, not only is the stop surface 71 covered with the material of the layer 5, preferably a thermoplastic, but the entire inner stop 7 is encompassed in a form-fitting manner by the layer. A force- and form-fitting connection between the layer 5 and the inner stop 7 is thereby produced.

The layer 5 can preferably be applied as an insert molding composed of a thermoplastic to at least a part of the toothing 23 of the splined shaft 22 by injection molding. For this purpose, the splined shaft 22 is introduced into an injection mold 4, as illustrated in FIGS. 7 and 8.

An enlarged cross-sectional view of the splined shaft 22, which is clamped in the injection mold 4, according to FIG. 6 is illustrated in detail in FIG. 7, said splined shaft being oriented within the mold cavity 41 and clamped in a centered manner.

When the injection mold 4 is closed, molten plastic is injected into the mold cavity 41 between the mold surfaces thereof and the outer circumference of the splined shaft 22 in the region of the toothing 23. The mold cavity 41 defines the dimensions and therefore the wall thickness of the layer 5 which still has to be introduced and which is applied according to the invention to the stop surface 71 and the toothing 23 and also forms the sliding coating.

Figure 8:
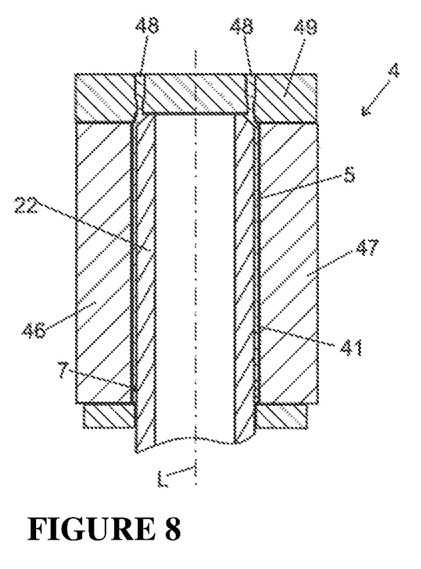
FIG. 8 is a longitudinal sectional view along the longitudinal axis through an example injection mold with a splined shaft of the steering shaft according to FIG. 2 clamped therein.

The injecting of the molten plastic into the injection mold 4 can take place at the injection-molding points 48 via axial injection nozzles arranged on the end side of the mold cavity 41, as illustrated schematically in FIG. 8. The injection-molding points 48 are located in an end wall 49 of the injection mold 4, said end wall lying opposite the free end of the splined shaft 3. For removal from the mold, said end wall 49 can be moved away from the splined shaft 3 in the axial direction.

Figure 9:
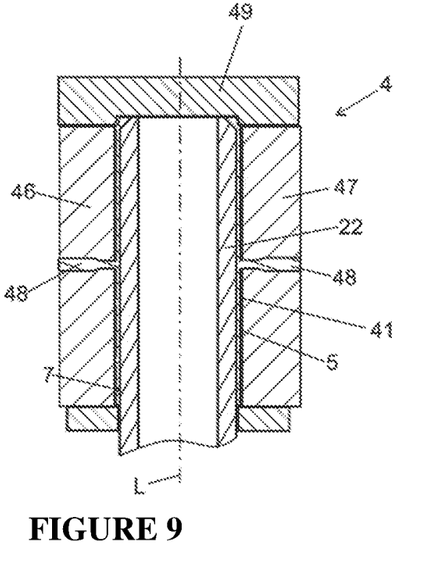
FIG. 9 is a longitudinal sectional view along a longitudinal axis as in FIG. 8 through another example injection mold.

Alternatively, the injection-molding points 48 can be arranged radially, as shown in FIG. 9.

After the cooling and curing of the layer 5 in the form of a plastics insert molding, the slides 46 and 47 are moved apart radially outward in a star-shaped manner for the removal from the mold, and therefore the splined shaft 22 which is completely insert-molded can be removed from the injection mold 4. The layer 5 in the form of a plastics insert molding is then connected to the splined shaft 22 substance-to-substance and in a form-fitting manner, in particular in the region of the stop surface 71 of the inner stop 7.

In FIGS. 8 and 9, the mold cavity 41 is already filled with the plastic introduced for the formation of the layer 5.

For the production of a steering shaft 2, as described above, a splined shaft 22 which is insert-molded with the layer 5 is introduced in the axial direction into the opening 26 of a hollow shaft 21 which is not yet provided with an outer stop 6. Calking of the end surface 213 then takes place, as illustrated in FIGS. 5 and 5a, for the plastic formation of the outer stop 6.

If the splined shaft 22 is then pulled out of the hollow shaft 21 in the axial direction, the inner stop 7 strikes against the outer stop 6 when the end position is reached, wherein the layer 5 which is injection-molded on the inner stop 7 is located between the stop surfaces 61 and 72 and damps the impact.

LIST OF REFERENCE SIGNS

1 Steering shaft
10 Input shaft
12 Output shaft
100 Motor vehicle steering system
102 Steering wheel
103 Steering mechanism
104 Steering pinion
106 Rack
108 Tie rod
110 Steerable wheel
112, 114, 116 Power assistance
118, 118' Torque sensor
120 Joint
121 Joint fork
2 Length-adjustable steering shaft
21 Hollow shaft
211 Internal toothing
212 Molding
213 End surface
22 Splined shaft
221 Free end
23 Toothing
24 Tooth
25 Stem
26 Opening 4 Injection mold
41 Mold cavity
46, 47 Slide
48 Injection-molding point
49 End wall
5 Layer
6 Outer stop
7 Inner stop
71, 61 Stop surface
L Longitudinal axis
V Length of toothing region
D Layer thickness

What is claimed is:

1. A length-adjustable steering shaft comprising:
    a hollow shaft that is comprised of metallic material and includes an opening;
    an inner shaft comprised of metallic material, the inner shaft being received rotatably-fixedly in the opening of the hollow shaft and in an axially movable manner; and
    a pull-out retention means that includes
        an outer stop that protrudes into the opening of the hollow shaft, with the outer stop being formed from the metallic material of the hollow shaft, and
        an inner stop that protrudes outward from the inner shaft, the inner stop being formed from the metallic material of the inner shaft, wherein the inner and outer stops comprise axial stop surfaces that are directed toward each other in an axial direction, wherein a layer of non-metallic material is applied at the axial stop surface of the inner stop, wherein the inner stop is disposed circumferentially between adjacent teeth of the inner shaft.

2. The length-adjustable steering shaft of claim 1 wherein the non-metallic material is softer than the metallic material of the hollow shaft and the metallic material of the inner shaft.

3. The length-adjustable steering shaft of claim 1 wherein the non-metallic material is thermoplastic.

4. The length-adjustable steering shaft of claim 3 wherein the layer of non-metallic material is configured as an insert molding.

5. The length-adjustable steering shaft of claim 1 wherein the layer of non-metallic material is fastened substance-to-substance to the inner stop.

6. The length-adjustable steering shaft of claim 1 wherein the inner stop is at least partially enclosed in a form-fitting manner by the layer of non-metallic material.

7. The length-adjustable steering shaft of claim 1 wherein the hollow shaft and the inner shaft comprise form-fitting elements that intermesh in a form-fitting manner with respect to a rotation about a longitudinal axis and are at least partially covered with the layer of non-metallic material.

8. A method for producing a length-adjustable steering shaft, the method comprising:
    providing a metallic hollow shaft and an inner shaft;
    producing an inner stop with an axial stop surface on the inner shaft, wherein producing the inner stop comprises pressing the inner shaft obliquely with respect to a longitudinal axis of the inner shaft such that metallic material at an edge of the inner shaft is plastically displaced so as to protrude radially outwards from an outer circumference of the inner shaft;
    introducing the inner shaft in the axial direction into an opening of the hollow shaft; and
    producing an outer stop with an axial stop surface on the hollow shaft, the outer stop engaging radially inward in an open cross section of the opening of the hollow shaft, wherein the axial stop surfaces of the inner stop and the outer stop are directed toward each other,
    wherein before the inner shaft is introduced into the opening of the hollow shaft, a layer of non-metallic material is applied at the inner stop.

9. The method of claim 8 comprising applying the layer of non-metallic material as an insert molding to the inner shaft by injection molding so as to cover at least part of the axial stop surface of the inner stop.

10. A method for producing the length-adjustable steering shaft of claim 1, the method comprising:
    providing the hollow shaft and the inner shaft;
    producing the inner stop with the axial stop surface on the inner shaft, wherein producing the inner stop comprises pressing the inner shaft obliquely with respect to a longitudinal axis of the inner shaft such that metallic material at an edge of the inner shaft is plastically displaced so as to protrude radially outwards from an outer circumference of the inner shaft;
    introducing the inner shaft in an axial direction into an opening of the metallic hollow shaft; and
    producing an outer stop with an axial stop surface on the metallic hollow shaft, the outer stop engaging radially inward in an open cross section of the opening of the hollow shaft, wherein the axial stop surfaces of the inner stop and the outer stop are directed toward each other in the axial direction,
    wherein before the inner shaft is introduced into the opening of the metallic hollow shaft, the layer of non-metallic material is applied at the inner stop.

11. The method of claim 10 comprising applying the layer of non-metallic material as an insert molding to the inner shaft by injection molding so as to cover at least part of the axial stop surface of the inner stop.

* * * * *